United States Patent [19]

Shock

[11] Patent Number: 4,752,098

[45] Date of Patent: Jun. 21, 1988

[54] REPLACEMENT FLOORING ASSEMBLY FOR DUMP TRUCKS OR R.R. CARS AND METHOD OF MAKING

[76] Inventor: John Shock, 251 Lothrop Ave., Grosse Pointe Farms, Mich. 48236

[21] Appl. No.: 10,105

[22] Filed: Feb. 2, 1987

Related U.S. Application Data

[63] Continuation-in-part of Ser. No. 755,726, Jul. 17, 1985, Pat. No. 4,644,631.

[51] Int. Cl.$^4$ .............................................. B62D 33/00
[52] U.S. Cl. ................................. 296/184; 296/39 R; 296/31 P
[58] Field of Search .................... 296/39 R, 39 A, 184, 296/31 P; 29/460, 402.09, 402.016

[56] References Cited

U.S. PATENT DOCUMENTS

| | | | |
|---|---|---|---|
| 2,962,323 | 11/1960 | McBride | 296/39 A |
| 3,084,973 | 4/1963 | Beckley | 296/31 P |
| 3,480,321 | 11/1969 | Brandt et al. | 296/184 |
| 3,533,531 | 10/1970 | Delahunt | 29/402.09 |
| 4,482,589 | 11/1984 | Widman | 296/31 P |

*Primary Examiner*—Robert R. Song

*Attorney, Agent, or Firm*—Cullen, Sloman, Cantor, Grauer, Scott, & Rutherford

[57] ABSTRACT

A replacement flooring for a dump truck, railroad car or other truck having a body upon a frame, the body including front and side walls and a flooring plate. The replacement flooring comprises a replacement floor plate superimposed over the flooring plate and peripherally welded and sealed thereto, defining a sealed chamber between the plates. A two-stage copolymer, including a resin, fills the chamber and is cured. The hardened cured filler spacer of the copolymer material is snugly interposed between the plates. A modified protective flooring includes a series of spaced, upright, U-shaped tubular stiffener rails with base portions thereof filled with a hardened thermosetting copolymer. Another modified protective flooring includes a metallic floor having a layer of cured, hardened thermosetting copolymer material thereunder, mounted over and secured to the flooring plate. A further modification includes a layer of cured, hardened thermosetting copolymer adhered to the flooring plate and a plurality of hardwood planks overlying the copolymer layer and secured thereto.

12 Claims, 3 Drawing Sheets

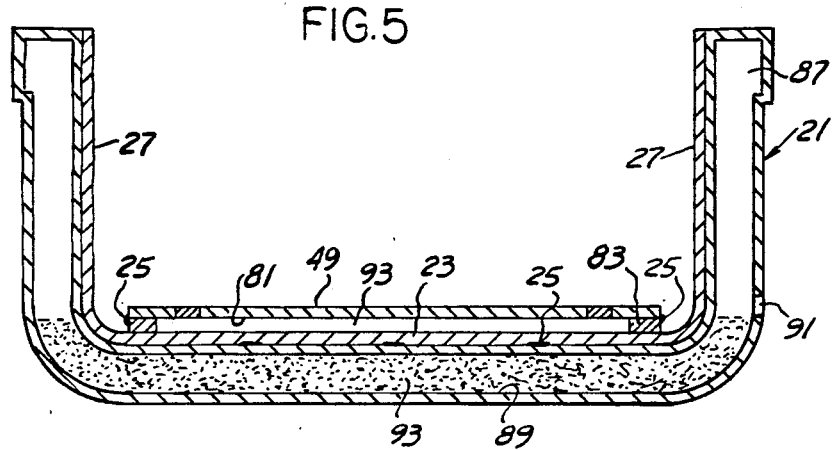
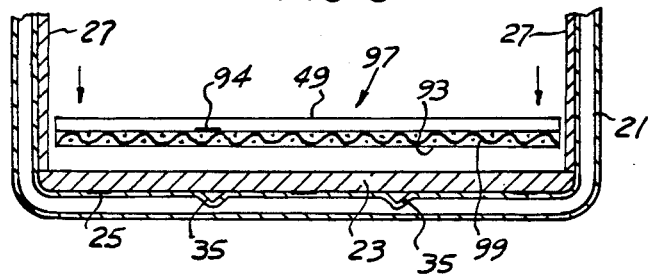
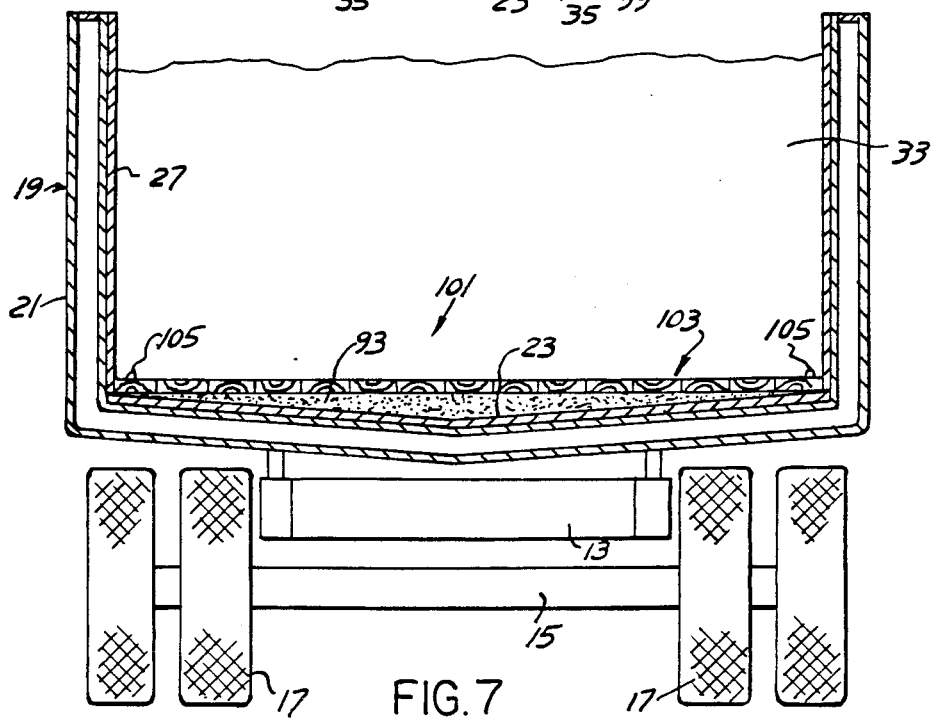

REPLACEMENT FLOORING ASSEMBLY FOR DUMP TRUCKS OR R.R. CARS AND METHOD OF MAKING

RELATED APPLICATION

This application is a continuation-in-part of my copending patent application Ser. No. 755,726, filed July 17, 1985 now U.S. Pat. No. 4,644,631 dated Feb. 24, 1987.

BACKGROUND OF THE INVENTION

Heretofore in the use of dump trucks including a tilt body or dump box having a pivotal tailgate, in railroad cars and off-road trucks, and the dropping of hard objects of metal and concrete into said trucks, eventually the flooring plate and sidewalls become damaged, distorted, bent, or fractured, requiring repair or replacement.

Heretofore in order to maintain the life of such flooring plates for dump trucks, railroad cars, and off-road trucks, it has been common to use a wood floor including a series of planks arranged side-by-side and mounted and secured upon the flooring plate and sidewalls or bolted thereto. These are usually 2" by 6" or 2" by 8" to provide a protective surface for the dump truck metal flooring and sidewalls.

The wood overstructure absorbs shock and protects the steel flooring plate from damage for a considerable period of time. Under severe usage, eventually the wood flooring becomes damaged or splintered and loses its protective character with respect to the underlying floor plate. Continued use of the dump truck results in subsequent damage to the floor plate distorting, fracturing, or bending portions thereof.

Heretofore it has been conventional practice to replace the wood flooring as soon as considerable damage to the floor has been noticed. Normally, such replacement involves approximately $300 for lumber and another $200 in labor to provide a replacement protective wood flooring normally bolted or otherwise secured to the basic flooring plate. The wood flooring under severe use lasts for approximately one year before it must be replaced and new lumber reinstalled. Often, when there is damage, distortion, bending, or fracture to the floor plate, it effects corresponding damage and cave-in of the sides of the dump truck body. The tailgate does not close properly.

Without proper care and replacement of the wood flooring, the basic steel flooring ultimately will be damaged, distorted, bent, or fractured to such an extent that its replacement is required at considerable expense. It is known to provide a reinforcement for the steel flooring of a dump truck and wherein overlying a hard wood flooring there is positioned and secured a second steel plate to overlie the wood flooring. This is an expensive procedure.

SUMMARY OF THE INVENTION

An important feature of the present invention is to provide a method of making a replacement flooring for a dump truck, a railroad car, or other truck and wherein the basic flooring plate has been damaged, fractured, bent or distorted. Another feature is to provide an auxiliary flooring for the basic flooring plate to prevent damage thereto.

It is another feature to provide a method of making a replacement flooring which eliminates the need for utilizing a replacement hard wood flooring and cost thereof.

An important feature is to provide for the damaged flooring plate of the dump truck, railroad car, or other truck with a replacement plate which is superimposed over the damaged flooring plate and peripherally welded thereto and wherein there is defined between the plates a sealed chamber.

A further feature includes the step of drilling one or a pair of vent openings through the replacement plate adjacent one end thereof and adjacent its opposite end drilling a fill opening. A further step includes injecting under pressure through the fill opening through a suitable nozzle a quantity of liquid thermosetting copolymer for filling the chamber between the plates.

A further feature includes a thermosetting copolymer selected from the group consisting of polyethylene, polyurethane, polypropylene, polystyrene and polycarbonate.

A further step includes filling the chamber between the plates with the thermosetting copolymer under a predetermined pressure and thereafter plugging up the openings in the replacement plate.

A final step includes curing the thermosetting copolymer for a period of time sufficient for it to harden, thereby providing a spacer filler between the plates substantially throughout their opposing surfaces in supporting engagement with the replacement plate, and to provide a cushion against further damage to the original floor. The same method could be used to protect the basic flooring against damage.

A further feature includes a replacement flooring for the damaged flooring plate of a dump truck, railroad car or other truck.

Another feature includes a replacement flooring wherein, after patching and repair of the damaged flooring plate, the replacement steel plate is positioned over and is peripherally welded to underlying portions of the damaged flooring plate to define between the plates a sealed chamber. A hardened, cured filter spacer of a thermosetting copolymer material is snugly interposed between the plates providing a protective support for the replacement plate and the old plate, preventing further indentations, puncturing or damage thereto.

A further feature as a part of the present method includes the preliminary step of patching or repairing the damaged flooring plate by welding thereto metallic patches to provide a sealed chamber between the respective plates when assembled and peripherally secured, into which the liquid two-stage thermosetting copolymer is injected under pressure and confined within the chamber.

Another feature is to provide a two-stage thermosetting copolymer which includes a suitable resin and polyisocyanate such as polyurethane which is initially pumped or injected into said chamber having a viscosity of a gear lube, i.e. a viscosity 742, CPS.

Another feature, before injecting of the two-stage thermosetting copolymer, is arrangement of the assembled plates at an acute angle to the horizontal for controlling the average height of the hardened filler once cured.

Another feature is to provide a replacement or protective steel plate to which has been preattached a layer of a thermosetting copolymer. There the replacement or protective plate is mounted over and peripherally secured or welded to the fractured depressed flooring plate, or to an undamaged flooring plate.

Another feature is to apply a layer of said copolymer over the fractured, depressed, or otherwise damaged floor plate, and after curing of the copolymer layer, applying and anchoring a series of hardened planks over the copolymer.

Another feature is to omit the planks and disperse within the resin a pulverized carbonate material and a marble dust, so that when cured, the carbonate resists abrasion and the marble dust resists impact.

These and other objects and features will be seen from the following specification and claims in conjunction with the appended drawings.

THE DRAWINGS

FIG. 5 is a fragmentary end elevational view of one of the plurality of U-shaped tubular stiffener ribs forming a part of a skeleton frame of a dump truck with the base of the stiffeners filled with a hardened thermosetting copolymer material.

FIG. 6 is a fragmentary exploded view of a modified replacement flooring.

FIG. 7 is a rear elevational view similar to FIG. 1, showing a modified wood flooring.

It is understood that the above drawings illustrates merely preferred embodiments of the invention, and that other embodiments are contemplated within the scope of the claims hereafter set forth.

DETAILED DESCRIPTION OF AN EMBODIMENT OF THE INVENTION

Figure 1:
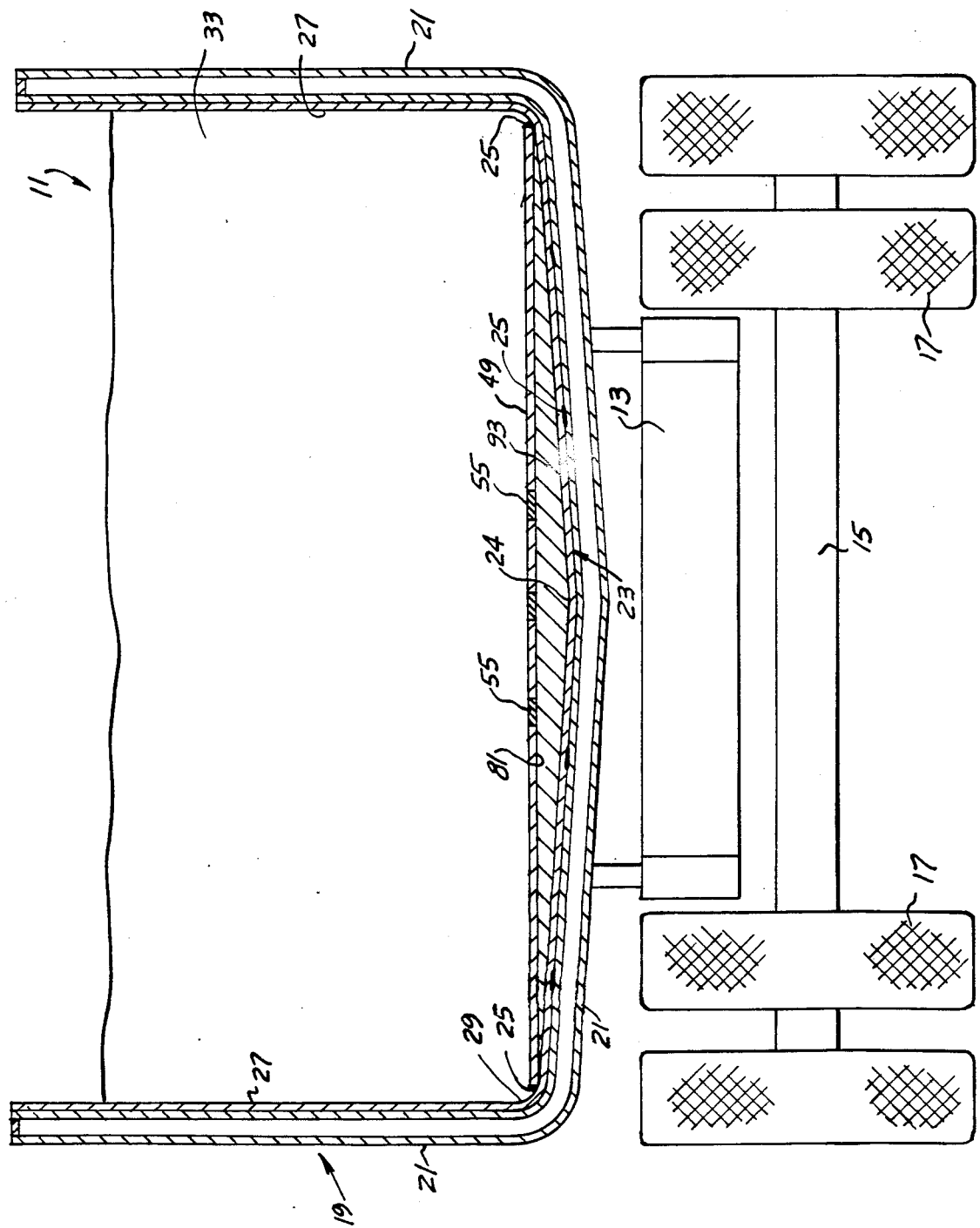
FIG. 1 is a schematic rear elevational view of a dump truck illustrating the present replacement flooring assembly for the damaged flooring plate of a dump truck body.

Referring to the drawings, FIGS. 1 through 4, a dump truck is schematically illustrated at 11 in FIG. 1 having a chassis 13 overlying and supported in a conventional manner upon a transverse axle 15 mounting the wheels 17.

Figure 2:
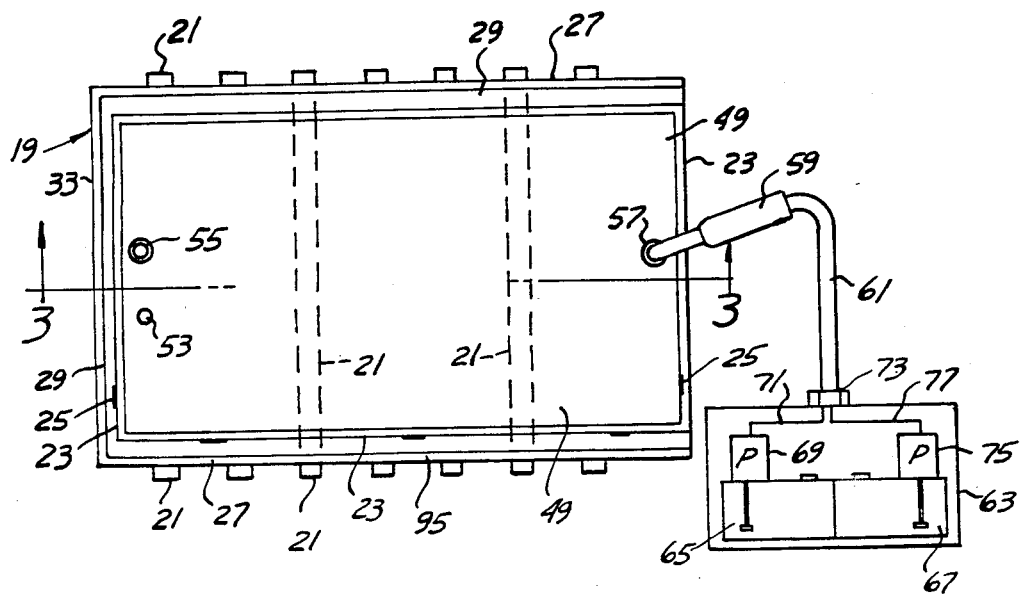
FIG. 2 is a schematic plan view of the dump truck body, on a reduced scale, illustrative of the step of injecting a two-stage thermosetting copolymer between the damaged flooring plate and the replacement plate, and the pumping apparatus.

The present dump truck includes a tilt body 19 as a conventional construction in the nature of a dump box with a pivotal tailgate, now shown, and wherein upon and along and overlying the chassis 13 and suitably secured thereto are a series of longitudinally-spaced upright U-shaped tubular ribs 21 defining a skeleton frame, FIG. 2. The bases of the ribs, normally flat, have been bent downwardly toward the center due to similar depression of the damaged flooring plate 23.

The tilt body 19 is nested within and secured upon the skeleton framework. In normal operation, and employing a hydraulic or pneumatic telescoping piston rod 45, FIG. 3, the tilt body 19 is adapted for tilting upwardly to a suitable acute angle sufficient for unloading.

In the illustrated embodiment, the tilt body includes front wall 33, fragmentarily shown in FIG. 1, and sidewalls 27, which in the illustrated embodiment are of 3/16th inch to 7/16th inch steel.

Figure 3:
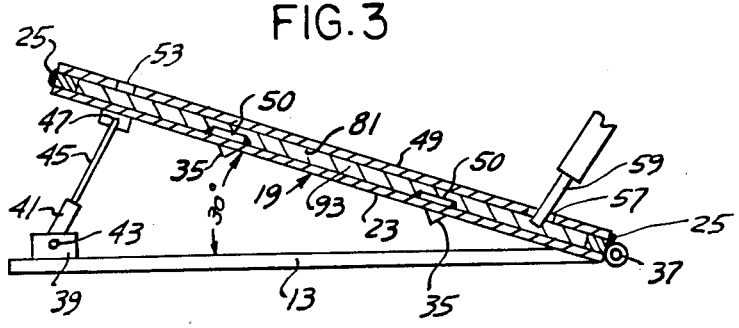
FIG. 3 is a sectional view thereof taken in the direction of arrows 3—3 of FIG. 2, illustrating the inclination of the floor plates during injection of the copolymer therebetween.

The respective sidewalls 27 at their lower ends terminate in the curved base portions 29 suitably connected to the steel flooring plate 23, hereafter referred to as the damaged, distorted, bent, or fractured steel flooring plate which has one or a plurality of fractures 35, FIG. 3.

The basic flooring plate 23, constructed of 3/16th to 7/16th steel, as a part of body 19 is originally flat and extends over the initially flat bottomed respective U-shaped tubular stiffener ribs 21 and is suitably secured thereto as by welds at 25, FIG. 1. In many conventional dump trucks, the flooring plate 23 as damaged is inclined from its sides inwardly and downwardly-defining a centerline 24 which extends longitudinally of the body.

As is a conventional construction, the basic flooring plate 23 and body 19 at its rearward end is pivotally hinged as at 37 to the chassis or framework 13 of the dump truck and is adapted for pivotal adjustments such as to the 30° angle shown, for illustration in FIG. 3. Tipping of body 19 is under the control of a hydraulic lift 39 of a conventional construction or other mechanical equivalent mechanism for elevating and tilting the body including the flooring plate 23 to the desired acute angle for dumping.

In the illustrative embodiment, the hydraulic lift includes a cylinder 41 pivotally mounted as at 43 upon the framework 13, FIG. 3, and includes a reciprocal telescoping piston rod 45 which at its upper end is pivotally connected at 47 to the forward undersurface of body 19 and specifically to the flooring plate 23.

In accordance with the present method, there is employed a rectangular replacement plate 49, preferably 3/16th" to 7/16th" steel which is cut so as to overlie the flooring plate 23, FIG. 2, and is suitably secured thereto.

In the illustrative embodiment, the replacement floor plate 49 is peripherally welded at 25 to underlying surface portions of flooring plate 23, thereby defining the sealed chamber 81.

In the illustrative embodiment disclosed in FIGS. 1 and 3, after considerable use and damage, the conventional and original flooring plate 23 has opposite side portions inclined downwardly and inwardly at 24. This defines a substantially triangular cross-section chamber 81. The maximum height of chamber 81 ranges from ½" to 2", for illustration. This depends upon the extent of damage to the original floor plate.

As a step in the method making a replacement flooring for the damaged dump truck flooring 23, after the replacement plate 49 has been peripherally welded in place FIGS. 1 and 2, one or a pair of air vents 53 are drilled through replacement floor plate 49 adjacent one end. After use they are closed by the plugs 55. Single fill hole 57 is drilled through replacement floor plate 49 adjacent its other end and is adapted to receive a pressure fill nozzle 59. Said nozzle is arranged at one end of the pressure hose 61 connected by hose fitting 73 to pump casing 63.

The apparatus for injecting a thermosetting copolymer material into chamber 81 between the respective plates 23 and 49 includes within pump casing 63 storage container 65 for a liquid isocyanate or any of the other alternately usable thermosetting copolymers.

The copolymer employed is selected from the group which includes polyethylene, polyurethane, polypropylene, polystyrene, and polycarbonate. In the illustrative embodiment, liquid isocyanate is stored within container 65. Within an adjacent storage container 67 in casing 63 there is provided a suitable liquid resin material.

The isocyanate and resin within said containers are liquid and are pumped as by the pumps 69 and 75 from the respective containers 65 and 67 through conduits 71 and 77 to hose fitting 73. By this assembly and during energization of pumps 69 and 75 from a suitable power source as is conventional, a two-stage thermosetting copolymer such as polyurethane is pumped through hose 61, through the nozzle 59, and through the filler opening 57 in plate 49 and into chamber 81.

In the illustrative embodiment, and as one of the steps in the present method, injection of thermosetting copolymer is done with the assembled plates 23 and 49 tilted at an acute angle, as for example 30°, FIG. 3.

The angle at which the assembled and sealed plates 23 and 49 is tilted determines the approximate height of the filler material 93 injected into sealed chamber 81 between plates 23 and 49.

Figure 4:
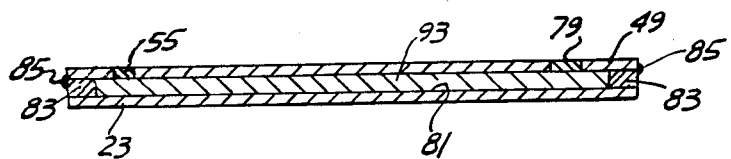
FIG. 4 is a cross-sectional view corresponding to FIG. 2 with the replacement plate uniformly spaced from the damaged plate.

After the injection of the required amount of thermosetting copolymer into chamber 81, filler opening 57 is closed by the plug 79, shown in FIG. 4, and the vent openings 53 are closed by plugs 55, FIG. 2.

In the modified replacement floor assembly, FIG. 4, the corresponding flooring plate 23 and the replacement plate 49 define a sealed chamber 81 which is of uniform height throughout the perimeter. This is achieved by the employment of peripheral spacers 83, generally of rectangular shape in cross-section which extend around the periphery of the respective plates 23 and 49 and are welded thereto as at 85. There still may be some angular depression of the damaged flooring plate 23.

As a final step, the thermosetting copolymer material is cured by permitting it to stand for a period of time sufficient that the copolymer material hardens to provide a filler spacer 93, FIG. 4. The hardened filler spacer is snugly interposed between plates 23 and 49 in registry with their adjacent surfaces and bears upon floor plate 23. Said plate was patched at 50, FIG. 3, for illustration, with the patches welded in place.

In the illustrative embodiment, the two-stage thermosetting copolymer material, including the resin, has a viscosity of gear lube, identified as viscosity 742, CPS, for illustration. After curing, the filler spacer 93 has a hardness 57 on a shore D gauge.

In the modification shown in FIG. 5, one of a plurality of longitudinally-spaced, upright, U-shaped tubular stiffener ribs 21 is shown which includes side chambers 87 and the horizontal bottom chamber 89. Utilizing a suitable fill hole 91, subsequently plugable as by the plug 55 shown in FIG. 2, thermosetting copolymer 93 is injected into the respective stiffener ribs 21 forming a part of the framework, using the apparatus of FIG. 2. Each of the ribs are filled in accordance with the present method. The injected thermosetting copolymer filling 93 within bottom chamber 89 is cured and hardened over a sufficient time, between one and four hours, for illustration.

By the construction shown in FIG. 5, the basic flooring plate 23 and the replacement plate 49 overlie a series of longitudinally-spaced, U-shaped upright tubular stiffeners 21 and are suitably secured thereto as by welds at 25.

In accordance with the present disclosure a thermosetting copolymer resin material selected from the group of copolymers above listed is injected in liquid form into said tubular ribs and after curing provides a hardened interior reinforcement for the bases of the corresponding stiffener ribs. The ribs so reinforced will not deflect due to the interior filler spacer reinforcement therein and thus provide a better supporting surface for flooring plate 23.

Spanning the spaces between the respective spaced ribs 21 are unsupported portions for flooring 23 applied thereto. The present replacement method, as above described with respect to FIGS. 1, 2, and 3, could be applied for the replacement floor assembly shown in FIG. 5.

The primary purpose of the illustration in FIG. 5 is to show a means by which the present two-stage thermosetting copolymer materials can be injected into base portions of the respective tubular stiffeners forming a part of the dump truck framework.

In reference to the flooring plate of a dump truck, it is regarded as equivalent that such plate be the flooring plate of any other trucks or a railroad car.

THE METHOD

The present method of making a replacement flooring for a dump truck having a tilt body 19 nested within and secured upon a skeleton frame 21, said body including sidewalls 27, front wall 33, and a damaged, distorted, bent or fractured steel flooring plate 23, includes the following steps:

1. Loosely superimposing a replacement steel floor plate 49 upon and overlying the top surface of the damaged flooring plate 23 having breaks or indentations designated at 35, FIG. 3;

2. Peripherally welding, as at 25, replacement plate 49 to underlying portions of the damaged floor plate 23, defining a sealed chamber 81, FIGS. 3 and 4;

3. drilling at 53 through replacement plate 49 one or more apertures or vents and successively drilling a fill opening 57, FIG. 2;

4. injecting, under pressure, a liquid mixture of a copolymer and resin 69, 75 through pipe 61 and nozzle 59 through the fill opening 57 and into the chamber 81, i.e., a quantity of liquid thermosetting copolymer 93. Since a large number of copolymers are available, the liquid thermosetting copolymer is selected from the group consisting of polyethylene, polyurethane, polypropylene, polystyrene, and polycarbonate and where in the preferred embodiment a polyisocyanate is employed with a resin for producing polyurethane;

5. under the operation of the respective pumps 69 and 75 connected to the storage container 65, for the liquid isocyanate and the storage container 67 for the liquid resin at 67, respectively liquid ingredients are delivered through fitting 73, conduit 61 and nozzle 59 under pressure into chamber 81 for filling the chamber with the thermosetting copolymer material;

6. plugging up the openings as by the plugs 55 and 79, FIGS. 2 and 4, to seal off chamber 81; and 7. curing the thermosetting copolymer for a period of time sufficient to provide a hardened spacer filler 93 between the plates 23 and 49, essentially throughout their opposing surfaces, in supporting engagement with replacement plate 49. In the illustrative embodiment, the curing time is in the range of one to four hours.

Where needed in the case where the basic flooring plate 23 has been fractured, there is the preliminary step of repairing and patching as at 50 the respective perforations 35, FIG. 3, using suitable 3/16" steel patches welded in place. This is to assure that the chamber 81 defined between the plates 23 and 49 is properly sealed and to prevent escape of the pressurized thermosetting copolymer before it has cured and hardened.

The liquid thermosetting copolymer, as delivered by nozzle 59, has a gear lube viscosity 741, approximately. The polyurethane, as pumped through the nozzle 59 is a two-stage material which includes a liquid resin and one of the identified copolymers such as liquid polyisocyanate.

As a further step or an additional step as defined in FIG. 5, the skeleton frame for the dump truck, as is conventional, has a series of longitudinally-spaced, upright, U-shaped tubular stiffener ribs 21 which normally have top rails as a part thereof which extend between the respective stiffener ribs. Often there is an intermediate side reinforcing rail connecting the respective ribs to make up the skeleton framework within which is nested the tilt body 19 for the dump truck.

A further step, in accordance with the present method, includes injecting under pressure a quantity of said liquid thermosetting copolymer through the fill hole 91 (thereafter plugged as at 55, FIG. 2) as at 93 for filling the bottom chamber 89 of the respective stiffeners 21. The side portions of the stiffeners at 87 need not be filled with the particular copolymer.

A further step includes the curing of the thermosetting copolymer as at 93 for a period up to three hours, for illustration, to provide a hardened reinforcing support within the base portion of each of the stiffeners.

In the present method, there is the intermediate step before injection of the copolymer between the plates, as shown in FIG. 3, namely tilting the plates 23, 49 at an acute angle to the horizontal, as for example at 30°. This angle can be changed to vary the depth of the copolymer material injected within sealed chamber 81.

A modified replacement flooring 97 for a dump truck or a railroad car or other truck is fragmentarily disclosed in FIG. 6, and wherein upon the conventional series of longitudinally-spaced stiffener ribs 21 of tubular form, there is the conventional flooring plate 23 above described which spans the ribs and is secured thereto as by welding at 25.

Where the original flooring plate 23 has been damaged or bent or indented, as above described and shown in FIG. 1, a modified replacement flooring 97 includes replacement steel plate 49. To the plate upon its undersurface has been preattached at 94 a layer 93 of the present thermosetting copolymer.

Once the copolymer sheet 93 has been cured upon the replacement plate 49, it may be separately applied to an existing damaged flooring plate 23. Plate 49 is shown spaced above plate 23. The replacement flooring plate, including the epoxy layer 93, is lowered onto the damaged flooring plate 25 and is suitably secured thereto peripherally as by welding or otherwise, such as by bolts.

In the illustrative embodiment, FIG. 6, relating to the preattachment of a copolymer to the sheet of steel 49, there may be employed an expanded metal grating 99 within the copolymer as an additional reinforcement. This application may be applied to the damaged flooring of a railroad car or any off-road truck as well as dump truck.

A modified flooring replacement is shown schematically at 101, FIG. 7, similar to the designation of the dump truck in FIG. 1. Upon the damaged and depressed basic flooring plate 23 there is applied a layer of the above-described thermosetting copolymer at 93. After the copolymer has been cured, taking the form shown in FIG. 7, there is applied thereto a wood flooring 103 consisting of a series of laterally aligned, longitudinally-extending hardwood planks suitably secured as at 105 to the underlying flooring plate 23.

FIG. 7 illustrates a modification of the present invention and wherein with less expense, instead of employing a replacement steel plate as at 49, FIG. 1, upon the cured epoxy layer 93, which has become hardened, there is applied a replacement wood flooring 103. This, therefore, provides a more economical flooring replacement than above-described with respect to FIG. 1 and under some conditions may be useful.

It is contemplated that the present method and flooring may be applied to undamaged flooring of a dump truck, railroad car, and other trucks. This is for the purpose of reinforcing, strengthening and protecting the basic floor against impact damage, wear and erosion.

The present method is the same except that it is unnecessary to make any repairs to the basic flooring before application of the secondary protective flooring shown in the drawings, FIGS. 1–7.

MODIFIED METHOD

The present modified method of making a protective flooring for the floor of a dump truck having a body 19 nested within and secured upon a skeleton frame 21, wherein said body includes sidewalls 27, front wall 33, and a steel flooring plate 23, includes the following steps:

1. Loosely superimposing protective steel floor plate 49 upon and overlying the top surface of flooring plate 23, FIG. 3;

2. peripherally welding as at 25 supplemental plate 49 to underlying portions of floor plate 23 defining a sealed chamber 81, FIGS. 3 and 4;

3. drilling at 53 through plate 49 one or more apertures or vents and successively drilling a fill opening 57, FIG. 2;

4. injecting, under pressure, a liquid mixture of a copolymer and resin 69, 75 through pipe 61 and nozzle 59 through the fill opening 57 and into chamber 81, a quantity of liquid thermosetting copolymer 93. Since a large number of copolymers are available, the liquid thermosetting copolymer is selected from the group consisting of polyethylene, polyurethane, polypropylene, polystyrene, and polycarbonate. In the preferred embodiment, a polyisocyanate is employed with a resin for producing polyurethane;

5. under the operation of the respective pumps 69 and 75 connected to storage container 65 for the liquid resin at 67, the respectively liquid ingredients are delivered through fitting 73, conduit 61 and nozzle 59 under pressure into chamber 81 for filling the chamber with the thermosetting copolymer material;

6. plugging up the openings by plugs 55 and 79, FIGS. 2 and 4, to seal off chamber 81; and 7. curing the thermosetting copolymer for a period of time sufficient to provide a hardened spacer filler 93 between the plates 23 and 49 essentially throughout their opposing surfaces in supporting engagement with plate 49. In the illustrative embodiment, the curing time is in the range of one to four hours.

With respect to FIG. 5, plate 49 may be a supplemental or protective plate. Flooring plate 23 need not be damaged and may be flat.

In FIG. 6, flooring 97 may be a protective flooring for a conventional, undamaged flooring plate 23. Protective plate 49, with a cured copolymer sheet 93 thereon, overlies undamaged floor plate 23 and is secured thereto.

In the modification 101, FIG. 7, the protective assembly 103 may be applied to and secured over an undamaged floor plate 23. Here, upon flooring plate 23, which may be flat, there is applied a layer of said thermosetting copolymer at 93. After curing of the copolymer, wood flooring 103 is applied over the cured copolymer and secured thereto.

As a further modification of FIG. 7, planks 103 are omitted. The epoxy layer 93 is modified by adding and dispersing within the liquid resin:

1. A pulverized carbonate material such as polycarbonate crystals.
2. A marble dust or pulverized marble. When the mixed copolymer is set and hardened, the carbonate resists abrasion and the marble resists impact.

Having described my invention, reference should now be had to the following claims.

I claim:

1. A replacement flooring for a dump truck having a body nested within and secured upon a skeleton frame, said body including front and side walls and a metallic flooring plate secured upon said frame;
    comprising a metallic replacement floor plate superimposed over said flooring plate;
    welds peripherally connecting and sealing said floor plate to said flooring plate, defining a sealed chamber between said plates;
    and a hardened cured filler spacer of a thermosetting copolymer material within and filling said chamber interposed between said plates substantially throughout their opposing surfaces, overlying said flooring plate and in supporting engagement with said replacement plate.

2. In the replacement flooring of claim 1, said thermosetting copolymer being selected from the group consisting of polyethylene, polyurethane, polypropylene, polystyrene, and polycarbonate.

3. In the replacement flooring of claim 1, said floor plate being damaged, distorted, bent or fractured, a plurality of spaced metallic patches overlying and welded to the fractured flooring plate for sealing off said chamber.

4. In the replacement flooring of claim 1, said copolymer filter spacer including a resin and an isocyanate.

5. In the replacement flooring of claim 1, said frame including a series of spaced, upright, U-shaped tubular stiffener ribs; and a hardened thermosetting copolymer filling the base portion of said stiffeners as a reinforcement therefor.

6. In the replacement flooring of claim 1, a continuous peripheral spacer of rectangular cross-section interposed between opposed peripheral portions of said plates and welded thereto, whereby said chamber and said spacer filler are of uniform height.

7. A replacement flooring for a dump truck having a body nested within and secured upon a skeleton frame, said body including front and side walls and a metallic flooring plate secured upon said frame;
    a metallic replacement floor plate of substantially the same shape as said flooring plate;
    a layer of a cured hardened spacer of a thermosetting copolymer material adhered to the undersurface of said replacement floor plate;
    said replacement floor plate and layer of cured copolymer material being mounted over and upon said flooring plate in snug registry therewith;
    and fastening means peripherally connecting said replacement floor plate to said flooring plate;
    said layer of copolymer material being interposed between said plates substantially throughout their opposing surfaces and supporting said replacement floor plate against indentation and other damage.

8. In the replacement flooring of claim 7, said thermosetting copolymer being selected from the group consisting of polyethylene, polyurethane, polypropylene, polystyrene, and polycarbonate.

9. In the replacement flooring of claim 7, an expanded metal grating set within said layer of copolymer material as a reinforcement therefor.

10. A replacement flooring for a dump truck having a body nested within and secured upon a skeleton frame, said body including front and side walls and a metallic flooring plate secured upon said frame;
    a layer of a cured hardened spacer of a thermosetting copolymer material overlying and adhered to said flooring plate over its area and having a planar top surface;
    a replacement flooring overlying said copolymer material including a plurality of hardwood planks arranged side-by-side and overlying said planar top surface;
    and fastening means securing said planks to said flooring plate.

11. In the replacement flooring of claim 10, said thermosetting copolymer being selected from the group consisting of polyethylene, polyurethane, polypropylene, polystyrene, and polycarbonate.

12. A replacement flooring for a dump truck having a body nested within and secured upon a skeleton frame, said body including front and side walls and a flooring plate secured upon said frame;
    a layer of a cured, hardened spacer of a thermosetting copolymer material overlying and adhered to said flooring plate over its area and having a planar top surface;
    said copolymer filler spacer including a resin, and said copolymer being selected from the group consisting of polyethylene, polyurethane, polypropylene, polystyrene, and polycarbonate;
    a pulver and carbonate and marbled dust dispersed and mixed within the resin, on curing of the filler, said carbonate resisting abrasion and said marble dust resisting impact.

* * * * *